United States Patent [19]

Carlson et al.

[11] 4,023,617

[45] May 17, 1977

[54] CONSTRUCTION HAVING INTEGRAL CIRCULATORY SYSTEM

[75] Inventors: Jon R. Carlson; Robert G. Jackson, both of Ponca City, Okla.

[73] Assignee: Continental Oil Company, Ponca City, Okla.

[22] Filed: Dec. 18, 1974

[21] Appl. No.: 533,914

Related U.S. Application Data

[62] Division of Ser. No. 428,554, Dec. 26, 1973, Pat. No. 3,895,152.

[52] U.S. Cl. .................... 165/169; 52/144; 62/45; 156/79; 165/168; 220/15

[51] Int. Cl.² .................................... F28F 3/12

[58] Field of Search .......... 165/169, 170, 154, 135, 165/136; 220/9 B, 9 LG, 20, 15; 161/68, 69, 109, 159, 160, 190; 52/309, 615, 618

[56] References Cited

UNITED STATES PATENTS

| | | | |
|---|---|---|---|
| 2,658,728 | 11/1953 | Evans, Jr. | 165/1 |
| 3,013,641 | 12/1961 | Compton | 165/169 |
| 3,024,606 | 3/1962 | Adams et al. | 165/168 |
| 3,206,057 | 9/1965 | Prew | 220/15 |
| 3,249,659 | 5/1966 | Voelker | 156/79 |
| 3,365,897 | 1/1968 | Middleton et al. | 62/45 |
| 3,698,145 | 10/1972 | Newman et al. | 52/144 |

FOREIGN PATENTS OR APPLICATIONS

| | | | |
|---|---|---|---|
| 606,284 | 8/1948 | United Kingdom | 165/70 |

*Primary Examiner*—C. J. Husar
*Assistant Examiner*—Daniel J. O'Connor
*Attorney, Agent, or Firm*—Cortlan R. Schupbach, Jr.

[57] ABSTRACT

In combination, a composite construction comprising a load-bearing substrate, an impermeable liner, and disposed therebetween a circulatory system defined by a network of cells having side walls which are generally in lateral orientation to the liner and the load-bearing substrate, at least some of said side walls having apertures therein whereby at least some adjacent cells are in communication with each other, and means for circulating a fluid through said circulatory system.

4 Claims, 8 Drawing Figures

CONSTRUCTION HAVING INTEGRAL CIRCULATORY SYSTEM

This is a division, of application Ser. No. 428,554, filed 12-26-73, now U.S. Pat. No. 3,895,152.

This invention relates to a novel construction or assembly for containing liquid or gaseous components and having an integral circulatory system which may be conveniently employed for detecting leaks or purging and the like.

Various types of construction are known for containing liquids and gases. Often times these constructions will include a liner covering the surface of a load-bearing member or wall wherein the liner is impermeable to the liquid or gaseous material in contact therewith. Some typical examples of such constructions are ceramic-lined reactors, resin or plastic-lined storage vessels, internally insulated cryogenic vessels, and the like. In these situations, the liner may be used to prevent contact between the liquids or gases and the load-bearing member due to their corrosive nature, due to their physical state as with cryogenic liquids, or due to other characteristics which would lead to failure of the load-bearing member. Other instances wherein such liners may be used include situations wherein the load-bearing member is not impermeable or where safety considerations must be met. These enumerated situations are merely exemplary and many others will undoubtedly occur to those working in the art.

In any event, when impermeable liners are employed it is desirable to be able to detect leaks which may develop in the liners prior to the time that adverse effects result from such leaks or at least sufficiently early that any adverse effects are minimized. It may, alternatively or additionally, be desirable for safety reasons to be able to purge the region immediately adjacent the liner opposite the side in contact with the contained liquids or gases.

Accordingly, this invention provides a novel construction or assembly for containing liquid or gaseous components and having an integral circulatory system which may be conveniently employed for detecting leaks in the liner, or for purging, or for any purpose wherein it is desirable to circulate a fluid between the liner and the load-bearing member. Briefly described, the construction or assembly comprises a load-bearing substrate, an impermeable outer liner, and disposed therebetween a circulatory system defined by a network of cells having side walls which are generally in a lateral orientation to the liner and the load-bearing substrate, at least some of said side walls having apertures therein whereby at least some of said cells are in communication with each other and define a continous circulatory system.

The invention may be more fully understood by reference to the drawings wherein several embodiments are illustrated as follows.

Figure 1:
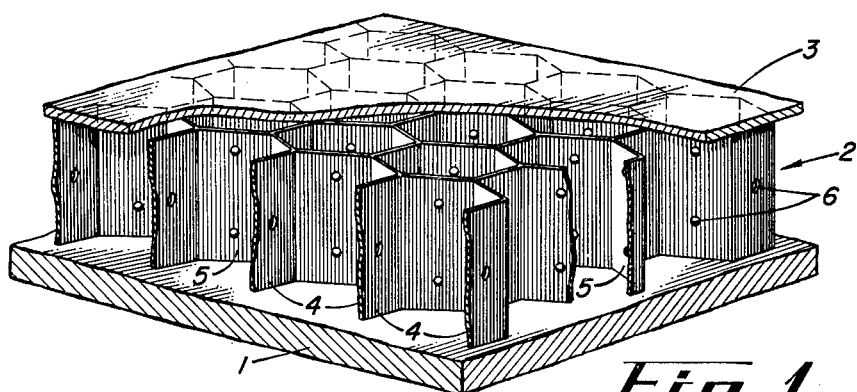
FIG. 1 is a partial cross-sectional elevation view of an embodiment of a basic construction of the invention, which construction in its entirety will form a container.

Referring first to FIG. 1, there is shown a construction comprising a load-bearing substrate 1, a cellular network 2 and an impermeable liner 3. This construction, in its entirety, may form a container for liquids or gases of any type such as a storage vessel, reactor, and the like, wherein the load-bearing substrate 1 represents the outer wall of the vessel or reactor.

The load-bearing substrate may be formed by any material having suitable strength and other properties for the particular use, for example, metals or metal alloys, glass fiber/resin laminates, wood and plastics may be used. It is also pointed out that the substrate may be formed by a single structural element or a plurality of structural elements which when combined provide the required characteristics.

The impermeable liner 3 serves primarily to prevent the liquids or gases being contained from directly contacting the load-bearing substrate. Thus, the liner need not necessarily possess the same strength characteristics as the load-bearing substrate. The liner does, however, need to be impermeable to the liquids or gases being contained. A variety of suitable materials are known for this purpose depending on the particular situation. Illustrative of such materials are glass and other ceramics; various plastics e.g. polyurethane, polystyrene, polyethylene, PVC, epoxy resins, polyesters, and the like, metals e.g. stainless steel, aluminum, etc; and the like.

The cellular network 2 which defines a circulatory system between the liner and the load-bearing substrate is formed by a plurality of cells 4 having side walls 5 provided with apertures 6. As illustrated, each cell is in communication with the adjacent cells due to the presence of the apertures so that a fluid may be circulated therethrough. However, it should be understood that any pattern of cell communication may be provided as desired to provide a continuous circulatory system.

Figure 3:
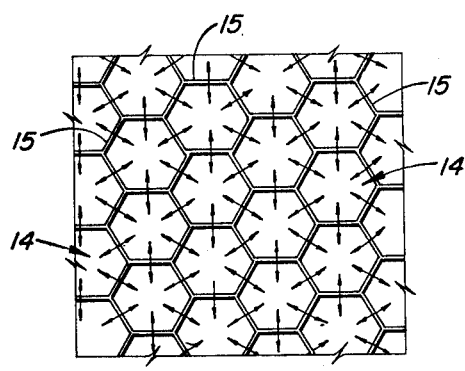
FIG. 3 is a partial cross-sectional view of the embodiment illustrated in FIG. 2 taken along line A—A showing the fluid flow paths between the cells.
Figure 5:
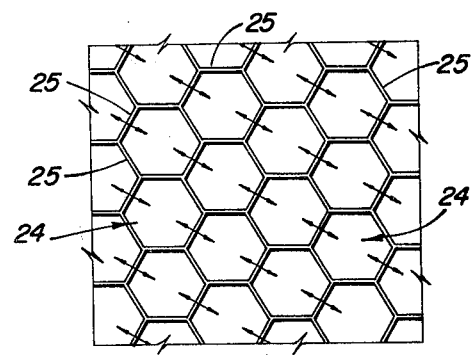
FIG. 5 is a partial cross-sectional view of the embodiment illustrated in FIG. 4 taken along line B—B showing the fluid flow paths between the cells.

The particular configuration of the cells is not a significant feature as long as the side walls are generally oriented laterally between the liner and the load-bearing substrate. For example, the cellular network may comprise a honeycomb of hexagonally-shaped cells such as depicted in FIGS. 3 and 5 to be discussed hereinafter. On the other hand, superposed corrugated sheets joined in such a manner as to form a cellular network are suitable. Other configurations will be apparent to those skilled in the art.

The cells may be formed of a variety of materials which would have suitable properties such as paper, metal, plastic and the like.

The apertures in the side walls of the cells will normally be provided at the time the cellular network is formed. Their frequency and location may be varied as desired to provide any type of flow path through the network. This ability to provide any type of flow path is a particularly significant feature of this invention. Obviously more than one aperture per side wall may be employed. Of course, if the cellular network is to provide some structural support it will be necessary to take this function into consideration in designing the flow path as will be understood in the art.

Various techniques are known in the art for forming cellular networks of the type used in this invention and need not be further elaborated. Suffice it to say that the necessary apertures in the side walls may be punched, molded, or otherwise formed during performance of any of these techniques of construction or assembly.

Figure 2:
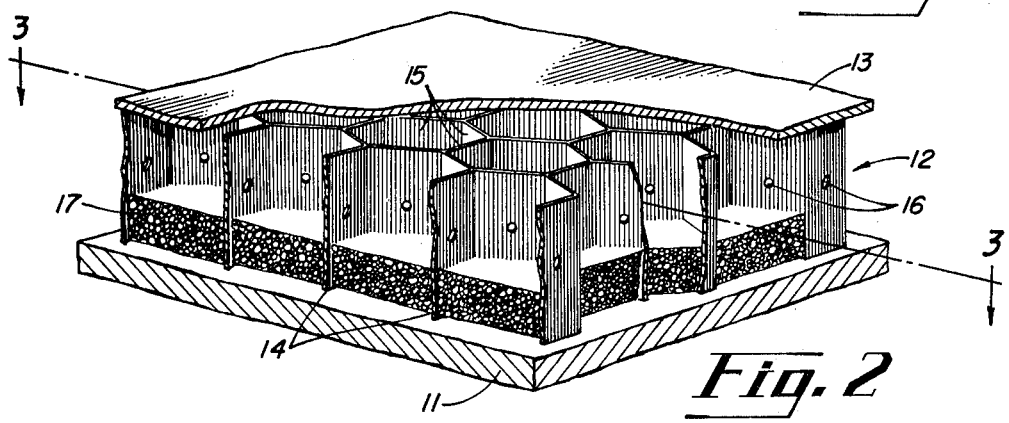
FIG. 2 is a partial cross-sectional elevation view of a modification to the basic construction illustrated in FIG. 1.

To illustrate two of many possible flow paths through a cellular network reference is made to FIGS. 2-5 wherein the network is illustrted as a honeycomb of hexagonally-shaped cells. In FIG. 2 each cell 14 is shown with an aperture 16 through each side wall 15. This design provides flow paths between an individual cell and each of the six adjacent cells as shown by the small double arrows. Contrasted with this omnidirectional flow path the apertures may be positioned in such a manner as to provide more control over the flow path. An example of a controlled flow path is illustrted in FIGS. 4 and 5 wherein apertures 26 are provided only in those side walls 25 of cells 24 which are aligned along the same axis. As a result, a series of parallel flow paths aligned with the same axes are provided. These flow paths may be interconnected with each other by simply providing apertures in a suitable side wall so that an overall curvilinear flow path throughout the entire structure formed by the construction of this invention, e.g. a vessel or reactor.

Figure 7:
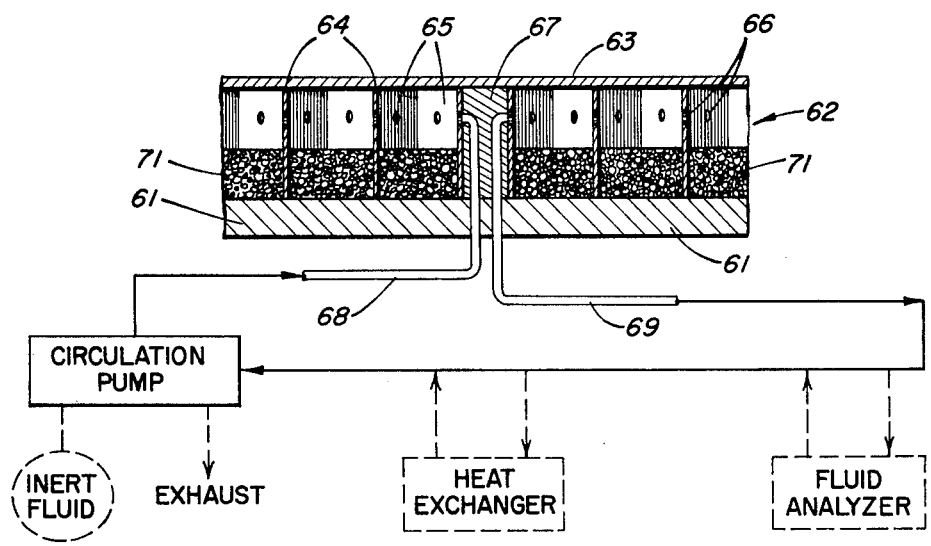
FIG. 7 illustrates schematically the manner in which a fluid may be circulated through a typical construction in accordance with the invention.
Figure 8:
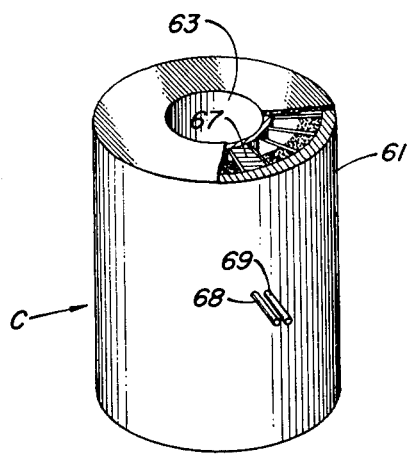
FIG. 8 illustrates a cylindrical vessel embodying the features depicted in FIG. 7.

Referring next to FIG. 7, means are illustrated for circulating a fluid through a circulatory system formed by a cellular network such as that described above. The construction shown in FIG. 7 may be more easily understood if one considers such construction as defining a cylindrical vessel C such as illustrated in FIG. 8. Common features illustrated in the two drawings include the load-bearing substrate 61 which forms the outer surface of vessel C, the impermeable liner 63 which forms the inner surface of vessel C, and the manifold 67 having inlet 68 and outlet 69 all of which will be described further hereinafter. It is to be understood that, in use, vessel C will be provided with a suitable base and top secured thereto, preferably of similar construction as the side.

In FIG. 7, the construction is shown comprising load-bearing substrate 61 and impermeable liner 63 with cellular network 62 disposed therebetween. These elements and their assembly are the same as the corresponding elements shown in FIG. 1 and described hereinbefore. Thus, the cellular network 62 defines a circulatory system formed by cells 64 having side walls 65 provided with apertures 66. The flow path provided by the design illustrated is like that shown in FIG. 3 wherein each cell is in communication with all adjacent cells. In addition, the cellular network is provided with an optional insulation layer 71 which fills a portion of each cell 64 and lies adjacent the load-bearing substrate 61. This insulation layer may be foamed plastic, fiberglass, or other conventional insulations and may itself be porous or impermeable as known in the art. Foamed plastic may be foamed in situ during assembly. It is preferred that loose insulation materials be sprayed with an adhesive or other suitable material such as a tackifier to cause at least the materials at the surface to adhere to each other in order that no interference with the circulatory system is incurred.

Disposed between the opposite ends and in sealing engagement with the assembly comprised of the load-bearing substrate 61 and cellular network 62 is manifold 67 having fluid inlet 68 and fluid outlet 69. Manifold 67 preferably does not extend entirely through the construction of this invention but only to the extent of the circulatory system of the cellular network. Thus, as shown, the impermeable liner 63 and the load-bearing substrate overlie the manifold. Fluid inlet 68 is in communication with the cellular network on one side of the manifold whereas fluid outlet 69 is in communication with the cellular network on the other side. By introducing a fluid through inlet 68 to the circulatory system it will flow through the cells of the cellular network and eventually reach the outlet 69 and be withdrawn from the system. Connecting inlet 68 and outlet 69 to a suitable circulation pump the fluid may be continuously circulated through the circulatory system of the construction of the invention.

The invention contemplates the circulation of various fluids for various purposes through the circulatory system. The term fluids is intended to encompass both liquids and gases. For example, air may be circulated as a sweep gas to remove any materials that may gradually seep through the liner. On the other hand, safety considerations may require the use of an inert fluid for this purpose. The fluid being circulated may be used for heating or cooling by passing it through an external heat exchanger. In these situations the fluid would normally be a liquid. A particular use, and one considered of primary importance for the construction of this invention, is that of passing a fluid through the circulatory system to detect leaks that may develop in the liner. Normally a gas will be used for this purpose. The gas will be of different composition than the materials being contained on the other side of the liner. Thus, if a leak in the liner should develop the circulating gas becomes contaminated and by passing the contaminated gas or a portion thereof through a standard analyzer for detecting changes in composition, e.g. gas-liquid chromatograph, such leak may be quickly detected.

The construction of the invention may take the form of various embodiments all of which include the basic structure described with respect to FIG. 1. For example, as depicted in FIG. 2, an insulation layer 17 may be provided to partially fill the cellular network in the regions adjacent the load-bearing substrate 11. It should be noted that this embodiment is the same as that described in reference to FIG. 7. Fabrication of an embodiment of this type may be accomplished by securing a preformed cellular network to the load-bearing substrate in the shape of a container, filling the cells of the cellular network with insulations to a suitable depth not interfering with the circulatory system, and subsequently applying and securing the impermeable liner. The method of application and securing of the various elements to each other will be dictated primarily by consideration of the type of materials being employed as is known in the art.

Figure 4:
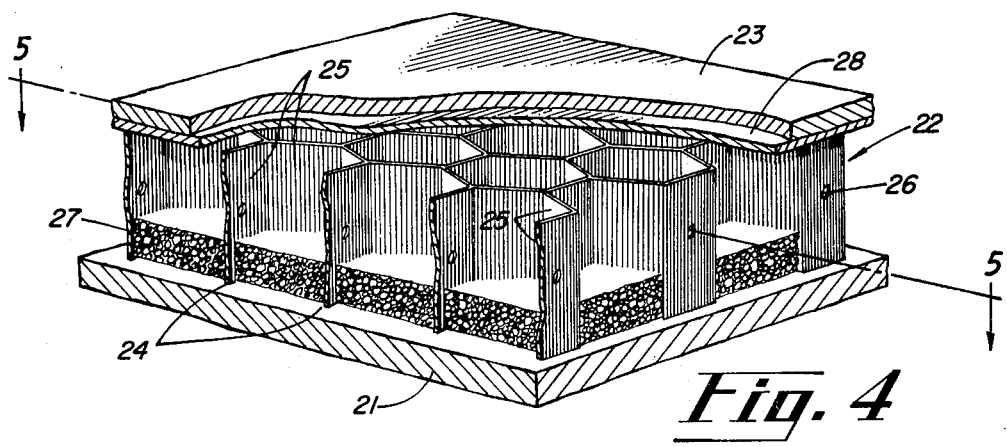
FIG. 4 is a partial cross-sectional elevation view of a further modification to the basic construction illustrated in FIG. 1.

Another embodiment is depicted in FIG. 4 which is similar to that described above except that an additional barrier member 28 to prevent passage of fluids may be interposed between the impermeable liner 23 and the cellular network comprised of cells 24. Such barrier member may be metallic sheet or foil or an impermeable plastic layer. The load-bearing substrate 21 and insulation 27 are the same as those hereinbefore described.

Figure 6:
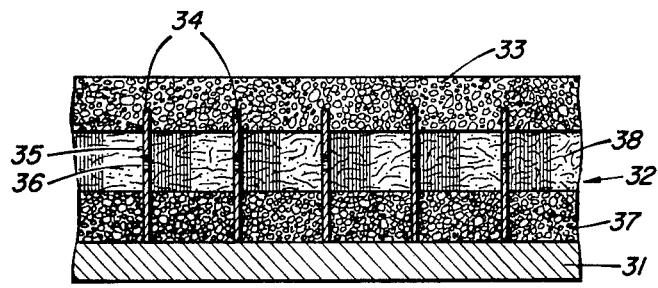
FIG. 6 is a partial cross-sectional elevation view of a further embodiment of the invention.

FIG. 6 depicts a further embodiment of the construction of the invention which is contemplated for specific use in the form of a storage vessel for a cryogenic liquid such as liquid natural gas. As with previous embodiments there is a load-bearing substrate 31 which may form the outer wall of the storage vessel. In juxtaposition thereto is a cellular network 32 comprising cells 34 with side walls 35 having apertures 36 thereby defining a circulatory system. Overlying the upper portion of the cellular network, as it appears in the drawing, is an impermeable liner 33. The liner in this case is formed by an impermeable polyurethane foam or like material and is in contact with the cryogenic liquid thus forming the primry barrier. The upper edges of the cell walls of the cellular network are embedded in the liner to ensure their intimate attachment.

Disposed within the cells 34 of the cellular network in the region adjacent the load-bearing substrate is an insulation 37. Such insulation is of an impermeable type thereby forming a secondry barrier to protect the load-bearing substrate and may be the same as that forming the liner 33. This insulation only partially fills the cells 34 so as not to interfere with the circulatory system.

Optionally, there may also be disposed in the region of the cells 34 forming the circulatory system a porous insulation 38 such as glass fibers or loose perlite granules or similar material which will not render the circulatory system inoperative yet still provide an additional insulating function.

Quite obviously many other variations on the basic construction of the invention are readily apparent and need no specific description. For example, in the embodiment of FIG. 6, rather than insulation being used for the liner 33 and the insulation 37 ceramic coatings might be employed, thus forming a container which would be well suited for conducting a variety of reactions.

It is also pointed out that the plastic layers may contain reinforcement such as reinforcing fibers, a scrim, a woven fabric, or the like, if the strength requirements are such that this is necessary.

Thus having described the invention in detail, it will be understood by those skilled in the art that certain variations and modifications may be made without departing from the spirit and scope of the invention as defined herein and in the appended claims.

We claim:

1. In combination, (A) a cryogenic liquid storage vessel comprising a load-bearing wall, a primary barrier layer of impermeable polyurethane foam, a circulatory system disposed therebetween defined by a network of cells having side walls which are generally in lateral orientation to the primary barrier layer and the load-bearing wall, at least some of said side walls having apertures therein thereby providing means whereby each cell is in communication with at least one adjacent cell in a manner defining a continuous controlled circulatory path passing through each cell of said network, and a secondary barrier layer of impermeable polyurethane foam partially filling the cells in the region between the apertures and adjacent the load-bearing wall, and (B) means for circulating a fluid through said circulatory system.

2. The invention of claim 1 wherein the network of cells is a honeycomb construction and those portions of the cell side walls in the region of the primary barrier layer are embedded in the impermeable polyurethane foam forming that layer.

3. The invention of claim 2 wherein the primary barrier layer contains a reinforcement.

4. The invention of claim 3 wherein the reinforcement is scrim, a woven fabric, or fibers.

* * * * *